Feb. 19, 1957 W. L. NORTON 2,782,080
ANTI-FRICTION BEARING
Filed March 20, 1953 2 Sheets-Sheet 1
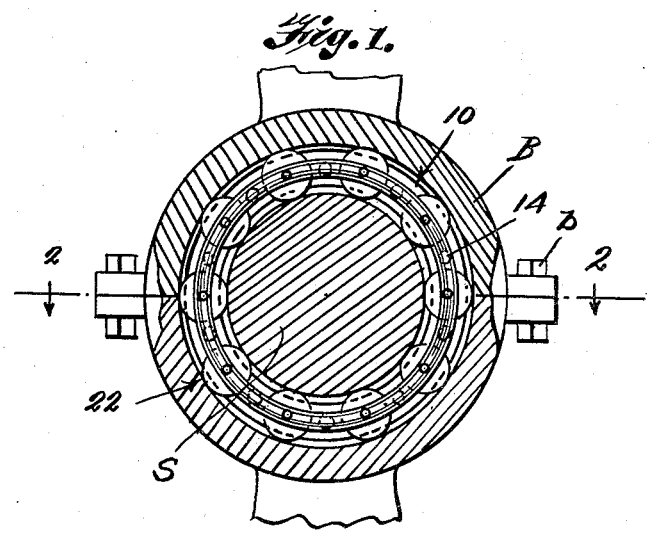
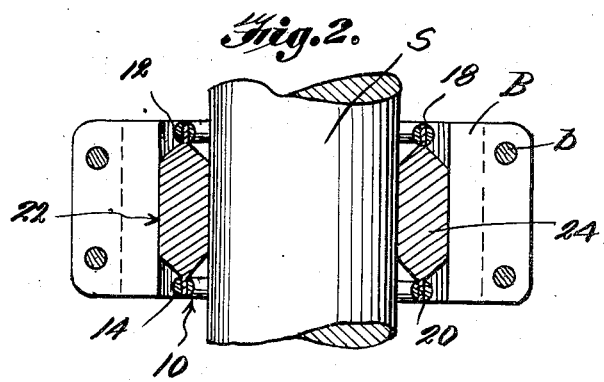
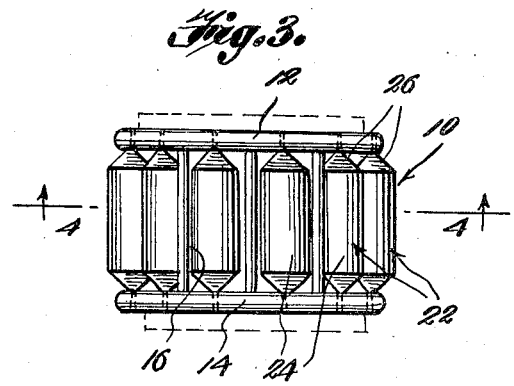
INVENTOR.
WILLIAM L. NORTON
BY
Patrick D Beavers
ATTORNEY Feb. 19, 1957
W. L. NORTON
2,782,080
ANTI-FRICTION BEARING
Filed March 20, 1953
2 Sheets-Sheet 2
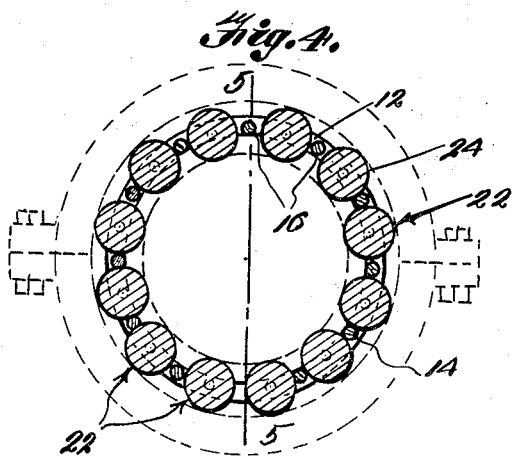
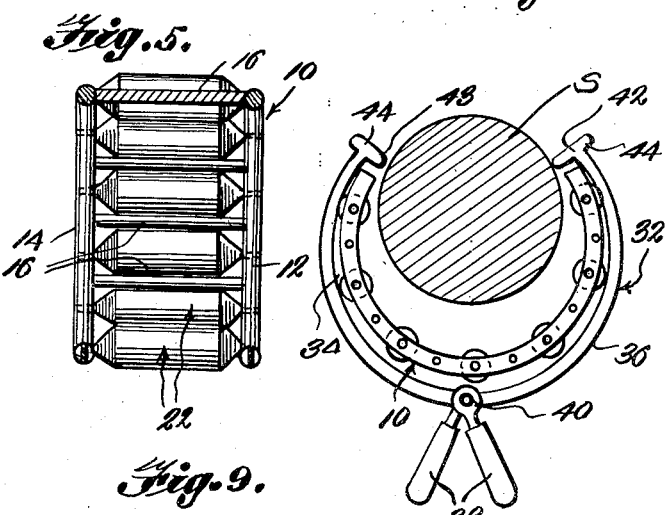
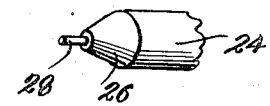
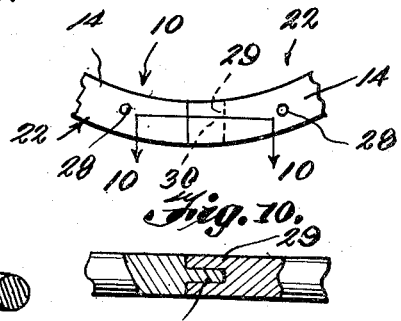
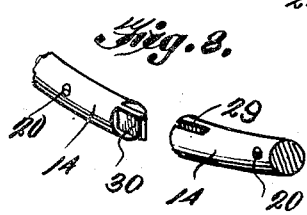
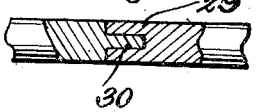
INVENTOR.
WILLIAM L. NORTON
BY
Patrick D Beavers
ATTORNEY United States Patent Office 2,782,080
Patented Feb. 19, 1957

2,782,080

ANTI-FRICTION BEARING

William L. Norton, Detroit, Mich.

Application March 20, 1953, Serial No. 343,707

4 Claims. (Cl. 308—217)

This invention relates to an anti-friction bearing and has for its primary object to render possible the application of an anti-friction bearing to mechanical devices of the type to which an end bearing cannot be fitted.

In the construction of engines, and the like where one piece crankshafts are employed the use of anti-friction bearings intermediate the ends of a crankshaft has heretofore been impractical owing to the impossibility of applying end bearings to the crank elements, and intermediate main bearings.

While previous attempts have been made to employ anti-friction ball-bearings to connecting rods and the like, as disclosed in Patent No. 1,340,310 and Patent No. 2,464,712, such devices are impractical of application particularly due to the fact that they employ spheres as the anti-friction bearing elements. The use of such anti-friction elements demands the employment of grooved races as guides for the spherical bearing elements and consequently present difficulties when attempts are made to split such bearings and align them properly in the wrist pin or connecting rod ends of a conventional connecting rod.

Another object of this invention is to facilitate the mounting of anti-friction roller bearings in places where the use of end bearings is not feasible.

A further object is to avoid the necessity of providing special races for the rollers and enable them to be employed directly against the surface of a crankshaft and the surface of the crankshaft supporting element.

The above and other objects may be attained by employing this invention which embodies among its features a unitary structure capable of being placed in encircling relation to a bearing surface such as the crank of a crankshaft or an intermediate bearing thereof, and which when installed will ride on a crankshaft encircling support without requiring the application of a specially grooved race.

Other features include a cage for holding an annular row of circumferentially spaced bearing rollers, which cage may be opened to facilitate the encircling of a crankshaft crank or the like with the annular row of bearing rollers.

Still other features include interengaging elements carried by adjacent ends of the cage for assuring proper alignment of the shaft encircling roller carriers when the bearing is finally mounted in operative position on the crankshaft or the like.

In the drawings:

Figure 1 is a sectional view through a crankshaft and bearing support showing this improved roller bearing in place, Figure 2 is a horizontal sectional view taken substantially on the line 2—2 of Figure 1, Figure 3 is a side view in elevation of an anti-friction bearing embodying the features of this invention, Figure 4 is a sectional view taken substantially on the line 4—4 of Figure 3, Figure 5 is a sectional view taken substantially along the line 5—5 of Figure 4, Figure 6 is an enlarged fragmentary sectional view through one of the cage elements showing the manner in which a roller is mounted therein, Figure 7 is a fragmentary perspective view on a slightly enlarged scale of one end of one of the rollers, Figure 8 is a fragmentary detailed perspective view of the interlocking elements of one of the cage members, Figure 9 is an enlarged fragmentary side view of the adjacent ends of one of the cage members showing the interlocking elements in detail, Figure 10 is a fragmentary sectional view taken substantially on the line 10—10 of Figure 9 and Figure 11 is a side view of the bearing showing the manner in which it is expanded by a suitable tool for application to a shaft.

Referring to the drawings in detail a crankshaft S is shown as being encircled by a split bearing support B opposite sections of which are joined by conventional bolts b so that the bearing support may be separably connected to the crankshaft.

Shown in encircling relation with the crankshaft S and within the bearing housing B is an anti-friction bearing designated generally 10 which comprises a pair of spaced parallel split rings 12 and 14 carrying circumferentially spaced tie bars 16 which are connected at opposite ends to the rings 12 and 14 and extend between the rings as will be readily understood upon reference to the drawings. Formed in the rings 12 and 14 are circumferentially spaced aligned openings 18 and 20 which are adapted to receive the trunnions of the rollers to be more fully hereinafter described.

Rollers designated generally 22 extend between the rings 12 and 14 substantially midway between adjacent tie bars 16, and each roller comprises an elongated circular cylindrical body 24 carrying at each end a conical extension 26 which terminates at its end remote from the body 24 in a trunnion 28. The trunnions 28 extend longitudinally from opposite ends, of each body 24 and aligned with the longitudinal axis of the body. The trunnions 28 extend respectively through aligned openings 18 and 20 in the rings 12 and 14 to form guides for the rollers 22 so as to maintain them in spaced parallel relation to one another and in a circumferential series about the axes of the rings. As illustrated in Figures 8 through 11 inclusive, the rings which are preferably of resilient material, are split and each ring is formed in one end with a recess 28 while the opposite end of each such ring is provided with a tongue 30 so that when the rings are closed, the tongues 30 will extend the recesses 28 as will be readily understood by reference to Figures 8 and 10.

Since the rings 12 and 14 are formed of resilient material and are complete circles each being separated only at one point in its circumference, it will be obvious that the rings will tend to close completely around an object, such as a crankshaft S. In order to apply a bearing to a crankshaft S I find it advantageous to employ a tool such as that designated generally 32 (Figure 11) which comprises a pair of jaws 34 and 36 carrying handles 38 and so pivoted as at 40 that when the handles are moved into adjacent positions as illustrated in Figure 11, the jaws will be spread. Each jaw is provided at its end remote from its respective handle with a hook 42 which is adapted to be engaged over the end of a bearing 10 so that as the handles are moved together, the bearing will be spread. An outwardly extending shoe 44 is carried by each jaw member adjacent its respective hook 42 to guide the tool and the bearing 10 carried thereby over the shaft S when positioning the bearing in place.

In applying an anti-friction bearing 10 to shaft S as illustrated in Figure 11, the bearing is opened as suggested by the tool 32 and passed over the shaft S until the bearing contacts the bearing surface of the shaft. Further movement of the tool 32 will cause the hooks 42 to disengage the ends of the bearing 10 and permit the bearing to snap into closed position about the shaft S. The tool may then be manipulated to expand the jaw members 34 and 36 and permit them to be extracted around the bearing 10, after which the shaft S with the bearing 10 supported thereon is encircled by the bearing support B and clamped in place by the bolts b.

Having described the invention what is claimed is:

1. A bearing comprising spaced concentric normally closed split rings of spring material, an annular row of circumferentially spaced elongated bars carried by and extending between the rings, said rings having aligning openings extending therethrough between the bars, an annular row of elongated bearing rollers extending between the rings adjacent the bars, trunnions carried by each bearing roller and extending longitudinally from opposite ends thereof, the trunnions lying an axial alignment with the longitudinal axes of their respective rollers, and the trunnions of each roller extending through aligned openings in the rings.

2. The structure defined in claim 1 in which each split ring has a groove opening through one end thereof and a tongue carried by the opposite end of the respective ring for entrance into the groove in its respective ring.

3. In a bearing for installation between the cranks of crankshafts and rods or the like; a roller bearing carriage provided with split crankshaft embracing structure of spring metal adapted to be sprung apart at its ends to fit the carriage snugly over the shaft crank, and roller bearings provided with outstanding reduced trunnions, said shaft embracing structure having small openings to receive the reduced trunnions.

4. In a bearing for installation between the cranks of crankshafts and rods or the like; a roller bearing carriage provided with split crankshaft embracing structure of spring metal adapted to be sprung apart at its ends to fit the carriage snugly over the shaft crank, and roller bearings provided with outstanding reduced trunnions, said shaft embracing structure having small openings to receive the reduced trunnions, said roller bearings being provided with longitudinally extending conical formations from which the trunnions project.

References Cited in the file of this patent

UNITED STATES PATENTS

| | | |
|---|---|---|
| 197,289 | Peters et al. | Nov. 20, 1877 |
| 664,821 | Perkins | Dec. 25, 1900 |
| 1,137,010 | Lockwood | Apr. 27, 1915 |
| 1,165,432 | Michaud | Dec. 28, 1915 |
| 1,173,719 | Hirth | Feb. 29, 1916 |
| 1,308,687 | Stark | July 1, 1919 |
| 1,764,198 | Carlson | June 17, 1930 |
| 2,438,174 | Laing | Mar. 23, 1948 |